Nov. 21, 1967 — G. A. SIXEL ETAL — 3,353,807
SMELTING FURNACE FOR THE PRODUCTION OF STEEL
Filed Oct. 20, 1964 — 2 Sheets-Sheet 1

Inventors:
Gustav Adolf Sixel
Walter Hess
By Ernest Montague
Attorney

United States Patent Office 3,353,807
Patented Nov. 21, 1967

3,353,807
SMELTING FURNACE FOR THE PRODUCTION OF STEEL
Gustav Adolf Sixel, Dusseldorf-Kaiserswerth, and Walter Hess, Essen-Heidhausen, Germany, assignors to Beteiligungs- und Patentverwaltungsgesellschaft mit beschrankter Haftung, Essen, Germany, a corporation of Germany
Filed Oct. 20, 1964, Ser. No. 405,221
Claims priority, application Germany, Oct. 29, 1963, B 74,056
3 Claims. (Cl. 266—11)

The present invention relates to a smelting furnace for the production of steel and method of operation of the smelting furnace.

It is known to use burners, which are operated with technically pure oxygen for the smelting of solid metallic charges, particularly of waste steel, cast-iron fractures, and others and thus for the production of liquid steel. This possibility of application of the burners did lead to a drum-furnace structure, the common characteristic of which is a hearth furnace having no chambers. In these hearth furnaces the solid charge is fed in form of a possibly small number of filling operations into the furnace. The great feeding of fuel and of technically pure oxygen through the burners causes a fast dropping of the charge on the surface. The dropping metal flows into the lower disposed, still cold range in the vicinity of the hearth bottom, solidifies there and forms a welded continuous block, which offers during this further melting of the solid charge only a comparatively small surface for the burner flame, on which surface the heat transfer takes place relatively slowly only, in spite of the high heat gradient.

It is one object of the present invention to provide a smelting furnace for the production of steel and a method of operation of the smelting furnace which avoids the drawbacks of the known furnace structures.

It is another object of the present invention to provide a smelting furnace for the production of steel and a method of operation of the smelting furnace, which for the better utilization of heat in connection with a solid metallic charge comprises two parts, since it consists of a smelting part and a refining part. The smelting part, which is equipped with one or a plurality of burners, which are operated with technically pure oxygen or with air enriched with more than fifty percent oxygen, is equipped with an oblique hearth, over which the liquefied metal flows off and particularly preferably over a layer disposed on the hearth and consisting of carbonization means, for instance coke lumps, into the refining part of the furnace.

The furnace is operated advantageously such, that the solid metallic charge is fed into the smelting part of the furnace in form of a plurality of filling operations.

The refining process in the refining part of the furnace can be performed after the smelting of the charge in any manner in accordance with one of the known steel producing methods, for instance, in accordance with the basic open hearth steel producing method, the oxygen blowing method or also in accordance with the electric steel manufacturing method. The refining period can, thereby, be combined advantageously with the filling and preheating period, so that only directly after the tapping of the previously charge at the start of the smelting period, the refining part of the furnace remains unused only as long, until therein a sufficiently large sump of liquid metal has formed for the start of the refining process.

It is of particular advantage, if the smelting part of the furnace is connected with a refining part, which is formed as an arc furnace, since then the electrodes can remain permanently in the furnace.

For the better utilization of the heat content of the waste gases, which brings about an increased durability of the refractory wall, it is advisable to arrange the gas off-take of the waste gases from the refining part of the furnace in the smelting part laterally and at the level of the solid metallic charge so low, that the waste gases must be drawn off through the solid charge or directly over the latter and to preheat the solid charge. In particular in the refining in the open hearth method and in the oxygen blowing method a large amount of gases having a high percentage of carbon monoxide is created during the refining process. By a corresponding excess in oxygen, the burner can then burn the carbon monoxide formed during the refining process in the furnace to carbon dioxide, whereby further amounts of heat are freed for the melting of the charge.

A further possibility of the utilization of the smelting part of the furnace in accordance with the present invention resides in the fact, that, instead of providing the refining part, a collecting vessel, for instance a drum-shaped vessel is provided, as it is used in pig iron mixers. This combination provides the advantage of a timely independency of the smelting process from the refining process. Yet, it is, thereby, of a disadvantage that the exploitation of the waste heat created during the refining process must be normally abandoned. A further heat loss is created during the emptying of the liquid metal from the collecting vessel.

With these and other objects in view, which will become apparent in the following detailed description, the present invention will be clearly understood in connection with the accompanying drawings, in which.

Figure 1:
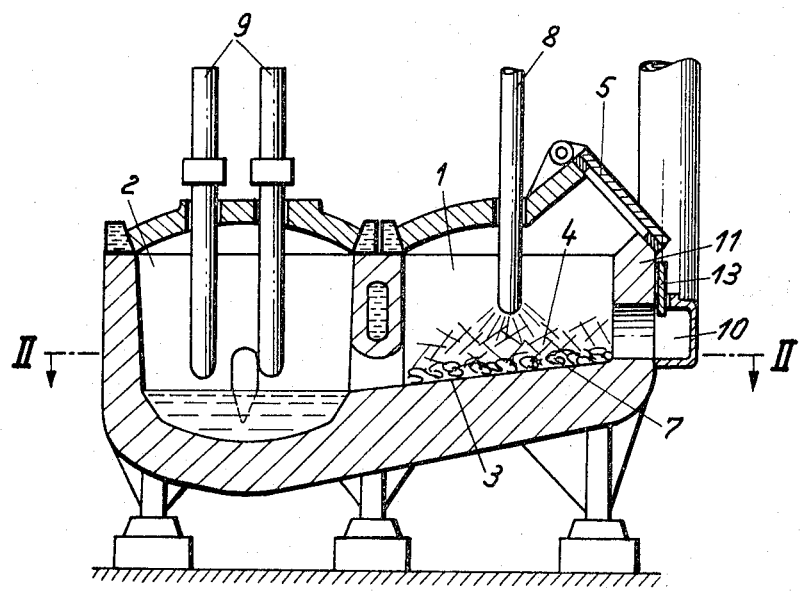
FIGURE 1 is a longitudinal section of a furnace with a smelting part and a refining part.

Referring now to the drawings, the furnace designed in accordance with the present invention comprises a smelting part 1, which is equipped with a hearth bottom 3 inclined towards a refining part 2 of the furnace. The smelting part 1 is furthermore equipped with a tiltable cover 5 lined with refractory material. Before the first portion of the solid metallic charge 4 to be molten is inserted into the smelting part 1 through the cover 5 by means of tilting slides 6 or also by means of charging boxes and rotary charging cranes or by pushing machines, a layer 7 of coke lumps, wood or other carbonizing means is applied to the inclined hearth bottom 3. After applying on this layer a first part quantity of the charge, this partial quantity is pre-heated by means of the oxygen burner 8 as long until the edges of the charge pointing to the burner 8 start dripping. In the same manner the now following partial quantities of the charge are subjected to the same treatment. Upon terminated filling, the total charge has so much basic heat, that during the following melting the liquefied metal flows off through the interstices of the solid charge 4 over the carbonization layer 7 on the hearth bottom 3 into the refining part 2 of the furnace. The flow off of the molten metal into the refining part 2 is appreciably supported by the carbonization layer 7, since the carbon dissolved therefrom and transferred into the metal reduces the melting point of the metal. A sufficient amount of carbon in the liquid metal is also required for the following steel production. The height of the layer of the carbonization means 7 is adjusted to the following refining method and to the desired steel quality. For the different refining methods, for instance, about the following heights of the layer of the carbonization means are to be considered.

Refining method: Layer height, mm.
- Electric-arc _____ 100–400
- Hearth furnace (equipped with burners)__ 150–600
- Oxygen refining _____ 300–1000

Figure 2:
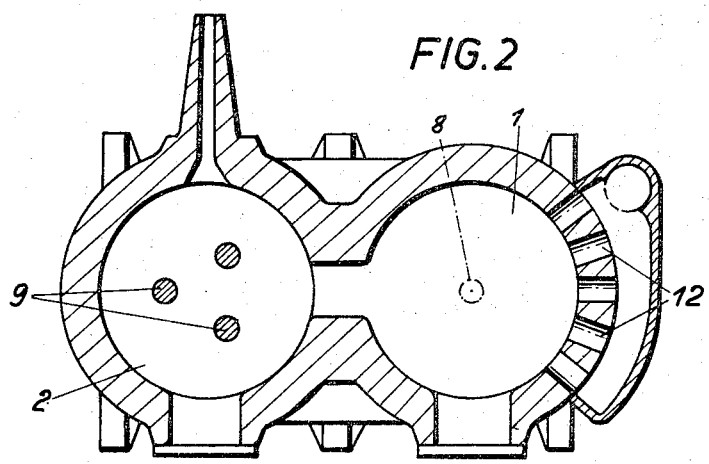
FIG. 2 is a section along the lines 2—2 of FIG. 1.

In case a more exact dosing of the carbon material is required for metallurgical reasons than it is possible by means of the carbonization layer 7, powderized carbon is additionally fed into the liquid metal. The refining process in the refining part 2 of the furnace can be performed, for instance, by means of the electric-arc method with the electrodes 9, however, also in any other manner in accordance with any other known steel producing process, as the basic hearth process or the oxygen-blowing process. The waste gases created in the refining process in the refining part 2 of the furnace are removed through a gas off-take 10, which is disposed in the smelting part 1 of the furnace laterally and at such a deep level, that the waste gases must pass through the still solid metallic charge 4 or directly over the latter and pre-heat the same thereby. The gas off-take 10 comprises a wide break in the furnace wall 11 of the smelting part 1 of the furnace, which, however, as shown in FIG. 2, also can consist of a plurality of small channels 12, which can be closed up partly by means of slides 13. The partly closure of the channels 12 by means of the slides 13 simplifies the problems with the working material and makes it possible to direct, first of all towards the end of the smelting of the solid charge 4, the flame gases onto the remaining scrap particles.

The direction of the flame can also be influenced by a corresponding rotation of the burner 14.

Figure 3:
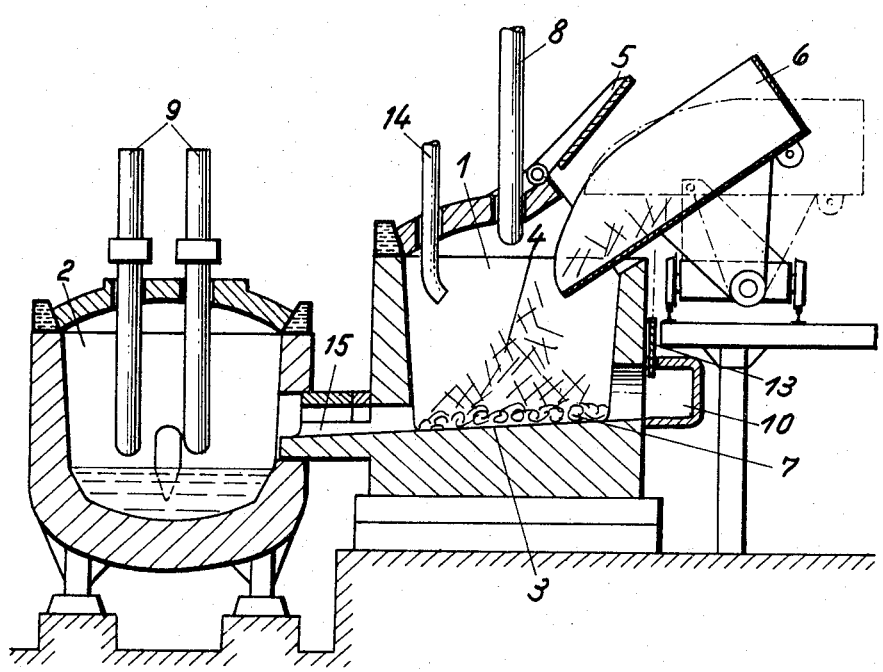
FIG. 3 is a longitudinal section of a furnace, the smeltingn part and refining part of which is connected together by means of a trough.

The embodiment disclosed in FIG. 3 shows a furnace, the smelting part 1 of which is connected with the refining part 2 by means of a groove 15. In case of a tiltable refining part 2, the groove 15 is introduced within the range of the rotating axis of the furnace.

Which type of the embodiments of the furnace based on the present invention is more economical in a particular case, depends upon the expenses for the charge and of the burning material, the production program and the production quantity, as well as upon the possibilities to utilize the waste heat of the metallurgical process for other purposes.

While we have disclosed several embodiments of the present invention, it is to be understood that these embodiments are given by example only and not in a limiting sense, the scope of the present invention being determined by the objects and the claims.

We claim:
1. A smelting furnace for the production of steel by using a solid metallic charge, comprising
   a smelting part including an inclined hearth,
   a second part comprising a collecting part disposed at a level lower than that of said smelting part to be used as a refining part,
   said smelting part communicating with said second part,
   said smelting part having at least one burner adapted to be operated selectively with industrially pure oxygen and at least over 50% oxygen enriched air,
   said inclined hearth being adapted to flow off the liquefied metal over a layer of carbonizing means disposed on said hearth into said second part, and
   a gas off-take for the waste gases in said smelting part disposed opposite said second part and at a level disposed in a plane extending through said solid metallic charge.
2. The smelting furnace, as set forth in claim 1, wherein said gas off-take comprises a plurality of channels defined in the wall of said smelting part, and
   slides disposed adjacent said wall of said smelting part and movable across said channels for selectively closing the said channels to a selected amount.
3. The smelting furnace, as set forth in claim 1, wherein said second part comprises a drum-shaped collecting vessel to be used as a collecting part.

References Cited

UNITED STATES PATENTS

| | | | |
|---|---|---|---|
| 1,476,106 | 12/1923 | Rochlitz | 75—43 |
| 2,002,010 | 5/1935 | Hilliard | 75—12 |
| 2,060,133 | 11/1936 | Summey | 75—10 |
| 3,060,014 | 10/1062 | Aihara | 75—43 |
| 3,153,588 | 10/1964 | Madaras | 75—43 |
| 3,264,096 | 8/1966 | Agarwal et al. | 75—40 |

FOREIGN PATENTS

| | | |
|---|---|---|
| 2,252 | 1878 | Great Britain. |

DAVID L. RECK, *Primary Examiner.*

H. W. TARRING, *Assistant Examiner.*